United States Patent Office.

OSCAR G. DITMARS, OF NEW YORK, N. Y.

Letters Patent No. 75,537, dated March 17, 1868.

IMPROVED MEDICAL COMPOUND.

The Schedule referred to in these Letters Patent and making part of the same.

TO ALL WHOM IT MAY CONCERN:

Be it known that I, OSCAR G. DITMARS, of the city, county, and State of New York, have invented or discovered a new and useful Composition of Matter or Medicine, called "The American Dyspepsia Cure," for curing or relieving dyspepsia in the human system, and the evils that usually precede or attend that disease, such as indigestion, gastralgia, flatulence, heart-burn, gastritis, water-brash, and weight at the pit of the stomach, and cognate diseases, and also for purifying the blood of the human system.

To enable others skilled in the art to make and use my invention or discovery, I will proceed to describe the materials of which my medicine is composed, and the relative proportions of each which I employ, and the manner of composing the same, and the mode of applying the same for curing or relieving the diseases and ills above mentioned.

First. The medicine is a liquid.

Second. It is composed of the following-named materials, and in the following proportions, viz, one gallon of best Bourbon whiskey, half a pound of wild cherry-tree bark, half a pound of peach-tree bark, half a pound of spikenard-root, half a pound of sarsaparilla-root.

Third. The requisite strength of the barks and roots above named is to be obtained by slow distillation, according to the ordinary process, to be conducted as follows: The whiskey is to be applied to the barks and roots when they are in a dry state, and no other liquid is to be used. Being thus saturated with the whiskey, the healing properties of the barks and roots are extracted by slow distillation, which should be continued, as the case may seem to demand, from five to ten days. During the distillation, the liquid should not be heated above about one hundred degrees (100°) of Fahrenheit, or what is called "blood heat." The temperature of the liquid should be kept as nearly equable as possible during the process of distillation. At the termination of the process of distillation, the liquor should be filtered, so as to leave a pure, clear liquid, which constitutes the medicine, and is ready for use. It may be preserved in bottles, or otherwise, as is desired. Some other spirituous liquor besides Bourbon whiskey may be used, but I prefer that kind. The proportions of the ingredients used in compounding the medicine may be somewhat varied, but I prefer the proportions above stated.

Fourth. The mode of administering the medicine is as follows: For dyspepsia, and the other evils and diseases above mentioned, give to an adult person from one-third to one-half of a gill immediately before each meal, except that for water-brash, and for weight or distress in the stomach, arising from eating or other cause, it is better to give about the same quantity immediately after each meal instead of before. Give to a child in like circumstances about one-third to one-half the above quantities.

Having thus described my medicine or composition of matter, what I claim as my invention or discovery, and desire to secure by Letters Patent, is—

The medicine herein described, called "The American Dyspepsia Cure."

OSCAR G. DITMARS.

Witnesses:
   HENRY STANTON,
   ALFRED ARNOLD.